United States Patent [19]
Shirk et al.

[11] Patent Number: 6,068,293
[45] Date of Patent: May 30, 2000

[54] VEHICLE OCCUPANT PROTECTION APPARATUS

[75] Inventors: Bryan W. Shirk, Mesa; Ahmad K. Al-Amin, Higley; Timothy A. Swann; Roy D. Van Wynsberghe, both of Mesa; Jess A. Cuevas, Scottsdale; Thomas H. Deming, Mesa, all of Ariz.

[73] Assignee: TRW Inc., Lyndhurst, Ohio

[21] Appl. No.: 09/086,809

[22] Filed: May 29, 1998

[51] Int. Cl.[7] .................................................. B60R 21/26
[52] U.S. Cl. ............................................................ 280/737
[58] Field of Search ........................................... 280/737

[56] References Cited

U.S. PATENT DOCUMENTS

| | | | |
|---|---|---|---|
| 3,743,318 | 7/1973 | Yamaguchi et al. | 280/737 |
| 3,822,895 | 7/1974 | Ochiai | 280/737 |
| 3,834,729 | 9/1974 | Oka et al. | 280/737 |
| 4,146,047 | 3/1979 | Wood et al. | 137/68.26 |
| 5,263,740 | 11/1993 | Frey et al. | 280/737 |
| 5,348,344 | 9/1994 | Blumenthal et al. | 280/737 |
| 5,468,015 | 11/1995 | Goetz | 280/737 |
| 5,487,559 | 1/1996 | Headley | 280/737 |
| 5,531,473 | 7/1996 | Rink et al. | 280/737 |
| 5,603,525 | 2/1997 | Zakula | 280/737 |
| 5,642,903 | 7/1997 | Headley | 280/737 |
| 5,678,856 | 10/1997 | Headley | 280/737 |

*Primary Examiner*—Kenneth R. Rice
*Attorney, Agent, or Firm*—Tarolli, Sundheim, Covell, Tummino & Szabo L.L.P.

[57] ABSTRACT

An apparatus (10) includes an inflator structure (12) and a pyrotechnic initiator (80). The inflator structure (12) defines an inflation fluid pressure chamber (15), and includes a closure structure (44) which closes the chamber (15). The closure structure (44) has a rupturable portion (48). A first body of pyrotechnic material (54) is mounted on the rupturable portion (48) of the closure structure (44). The initiator (80) is mounted on the inflator structure (12) separately from the first body of pyrotechnic material (54), and contains a second body of pyrotechnic material (88). When the second body of pyrotechnic material (88) is ignited, it produces combustion products that ignite the first body of pyrotechnic material (54).

10 Claims, 4 Drawing Sheets

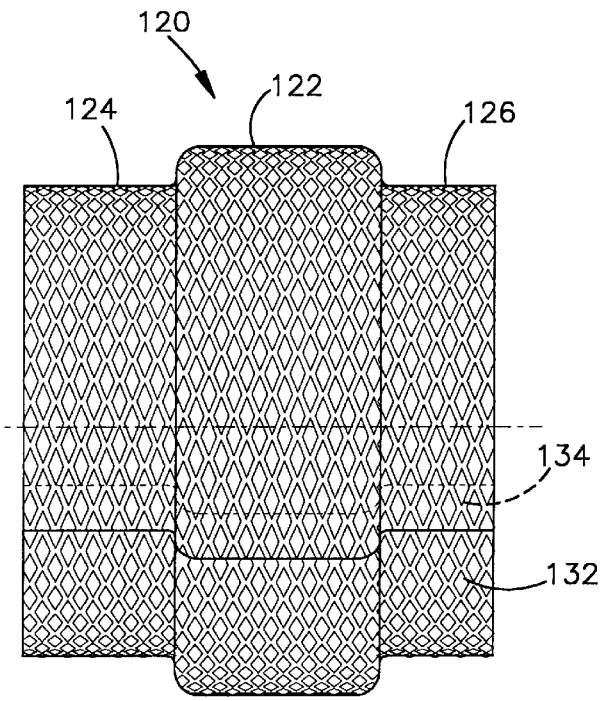
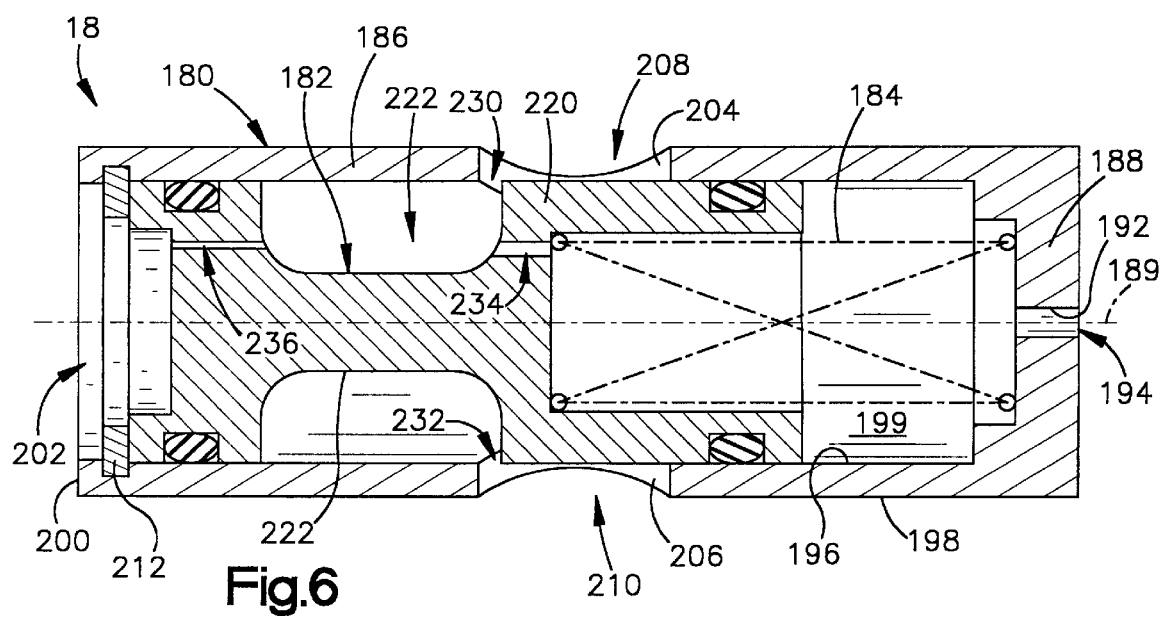

VEHICLE OCCUPANT PROTECTION APPARATUS

FIELD OF THE INVENTION

The present invention relates to an inflator for an inflatable vehicle occupant protection device.

BACKGROUND OF THE INVENTION

An inflatable vehicle occupant protection device, such as an air bag, is inflated upon the occurrence of a vehicle crash. The air bag is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated and emits inflation fluid which inflates the air bag into the vehicle occupant compartment. The air bag can then engage a vehicle occupant to help protect the occupant from a forceful impact with parts of the vehicle as a result of the crash.

The inflator includes a structure defining an inflation fluid pressure chamber. A closure portion of the inflator structure closes the chamber. The inflator further includes a pyrotechnic initiator which, when actuated, emits pyrotechnic combustion products that cause the closure portion of the inflator structure to rupture so that inflation fluid in the chamber can flow from the inflator to the air bag.

SUMMARY OF THE INVENTION

In accordance with the present invention, an apparatus comprises an inflator structure and a pyrotechnic initiator. The inflator structure defines an inflation fluid pressure chamber, and includes a closure structure which closes the chamber. The closure structure has a rupturable portion. A first body of pyrotechnic material is mounted on the rupturable portion of the closure structure. The initiator is mounted on the inflator structure separately from the first body of pyrotechnic material, and contains a second body of pyrotechnic material. When the second body of pyrotechnic material is ignited, it produces combustion products that ignite the first body of pyrotechnic material.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein:

FIG. 5 is an enlarged view of another part of the apparatus of FIG. 1;

FIG. 6 is an enlarged sectional view of other parts of the apparatus of FIG. 1;

DESCRIPTION OF PREFERRED EMBODIMENTS

Figure 1:
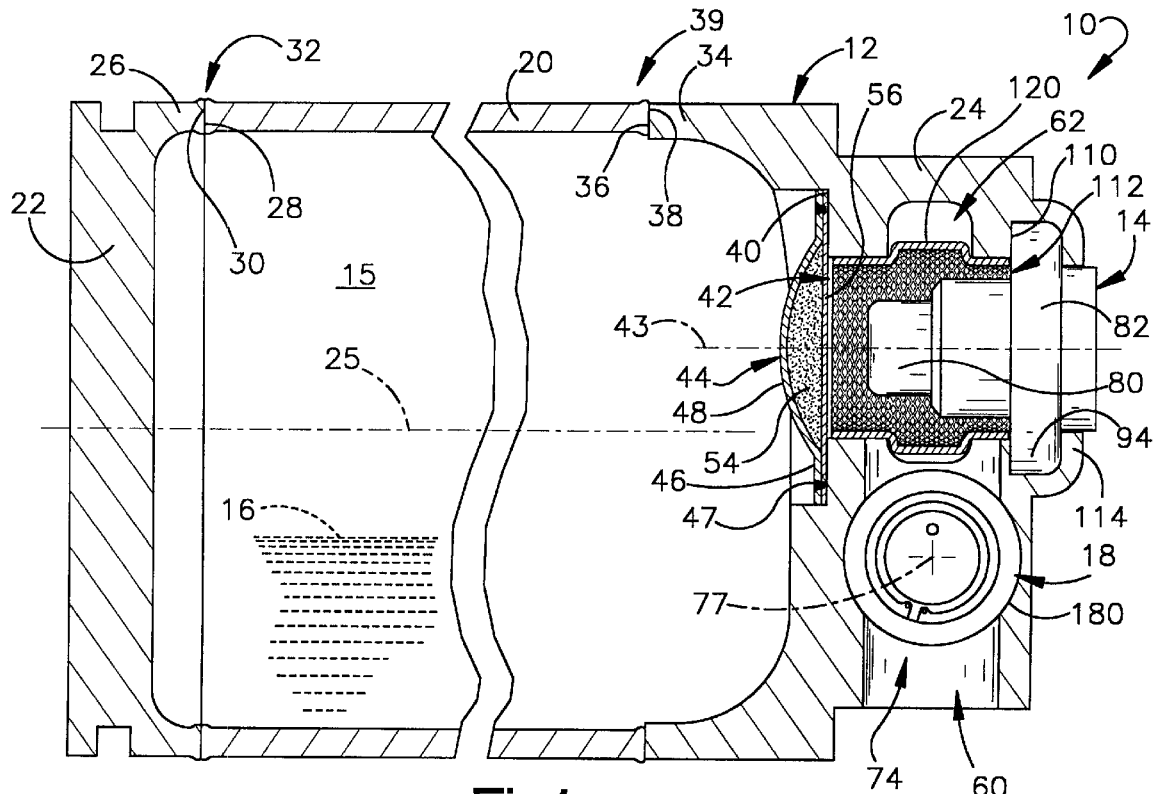
FIG. 1 is a side view, partly in section, of an apparatus comprising a first embodiment of the present invention.

An inflator 10 comprising a first embodiment of the present invention is shown in FIG. 1. The inflator 10 comprises a source of inflation fluid for an inflatable vehicle occupant protection device such as an air bag. The inflator 10 thus includes a container 12 and an initiator assembly 14. The container 12 defines a pressure chamber 15 storing pressurized inflation fluid 16. When the initiator assembly 14 is actuated, it opens the container 12 to initiate an outlet flow of inflation fluid. The inflator 10 further includes a valve assembly 18 which regulates the outlet flow of inflation fluid.

The inflation fluid 16 stored in the chamber 15 preferably consists essentially of helium at a storage pressure within the range of about 4,000 psi to about 7,000 psi. However, the inflation fluid 16, may have any other composition and storage pressure suitable for inflating an air bag or other vehicle occupant protection device.

The container 12 has a tubular body wall 20 and a pair of generally circular opposite end walls 22 and 24, each of which is centered on a longitudinal axis 25. The first end wall 22 has an axially projecting rim portion 26. An annular end surface 28 of the rim portion 26 abuts an annular end surface 30 of the body wall 20. A first friction weld 32 fixes and seals the first end wall 22 and the body wall 20 together at their abutting end surfaces 28 and 30. The second end wall 24 similarly has an axially projecting rim portion 34 with an annular end surface 36 abutting an annular end surface 38 of the body wall 20. A second friction weld 39 fixes and seals the second end wall 24 and the body wall 20 together at their abutting end surfaces 36 and 38.

The second end wall 24 of the container 12 has an annular inner shoulder surface 40 facing inward of the chamber 15. The inner shoulder surface 40 defines a circular chamber opening 42 which is centered on an axis 43 spaced radially from the central axis 25. The container 12 further has a closure part in the form of a burst disk 44 which closes the chamber 15 at the opening 42. A flat, annular rim portion 46 of the burst disk 44 overlies the inner shoulder surface 40 around the opening 42, and is fixed and sealed to the end wall 24 by a circumferentially extending weld 47. A dome-shaped central portion 48 of the burst disk 44 extends across the opening 42.

Figure 2:
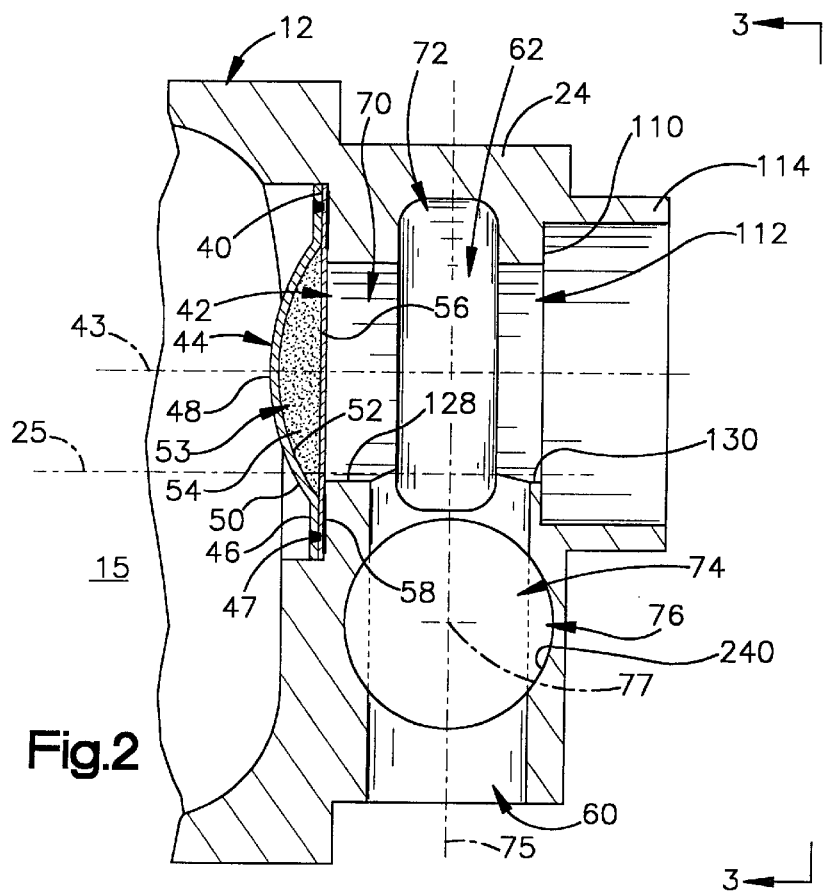
FIG. 2 is an enlarged view showing parts of the apparatus of FIG. 1 in a partially assembled condition.

As best shown in FIG. 2, the central portion 48 of the burst disk 44 has a convex inner side surface 50 facing inward of the chamber 15, and has a concave outer side surface 52 facing outward of the chamber 15. The outer side surface 52 defines a recess 53 containing a body of pyrotechnic material 54. A circular sheet of metal foil 56 extends diametrically across the recess 53, and adjoins the rim portion 46 of the burst disk 44 fully about the periphery of the recess 53. The sheet of metal foil 56 is fixed and sealed hermetically to the burst disk 44 by an adhesive bond 58 extending circumferentially about the juncture of the sheet 56 and the rim 46 of the burst disk 44. In this arrangement, the sheet of metal foil 56 retains the pyrotechnic material 54 in the recess 53, and also protects the pyrotechnic material 54 from the ambient atmosphere.

In the first embodiment of the present invention, the second end wall 24 of the container 12 defines an inflation fluid exit opening 60, and also defines a fluid flow path 62 extending from the chamber opening 42 to the exit opening 60. The valve assembly 18 (FIG. 1) is operatively disposed in the flow path 62 near the exit opening 60. The initiator assembly 14 projects into the flow path 62 between the chamber opening 42 and the valve assembly 18.

As shown in FIG. 2, the flow path 62 has a plurality of generally distinct portions located between the chamber opening 42 and the exit opening 60. These include a relatively short cylindrical portion 70 extending axially outward from the chamber opening 42. An annular portion 72 of the flow path 62 extends radially and axially outward from the short cylindrical portion 70. A longer cylindrical portion 74 of the flow pa-h 62 extends radially from the annular portion 72 to the exit opening 60, and is centered on an axis 75 perpendicular to the axis 45.

Figure 3:
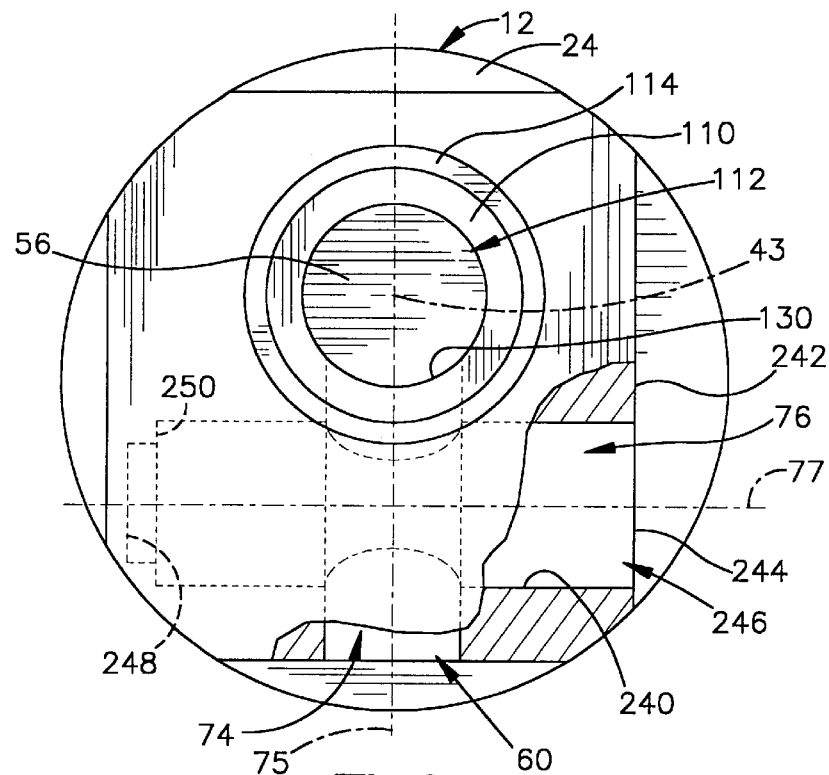
FIG. 3 is a view taken on line 3—3 of FIG. 2.

Also shown in FIG. 2 is a cylindrical valve compartment 76. The valve compartment 76 intersects the radially extending portion 74 of the flow path 62, and is centered on an axis 77 perpendicular to the axis 75. As described more fully below with reference to FIG. 3, the valve compartment 76 is sized to receive the valve assembly 18 (FIG. 1).

Figure 4:
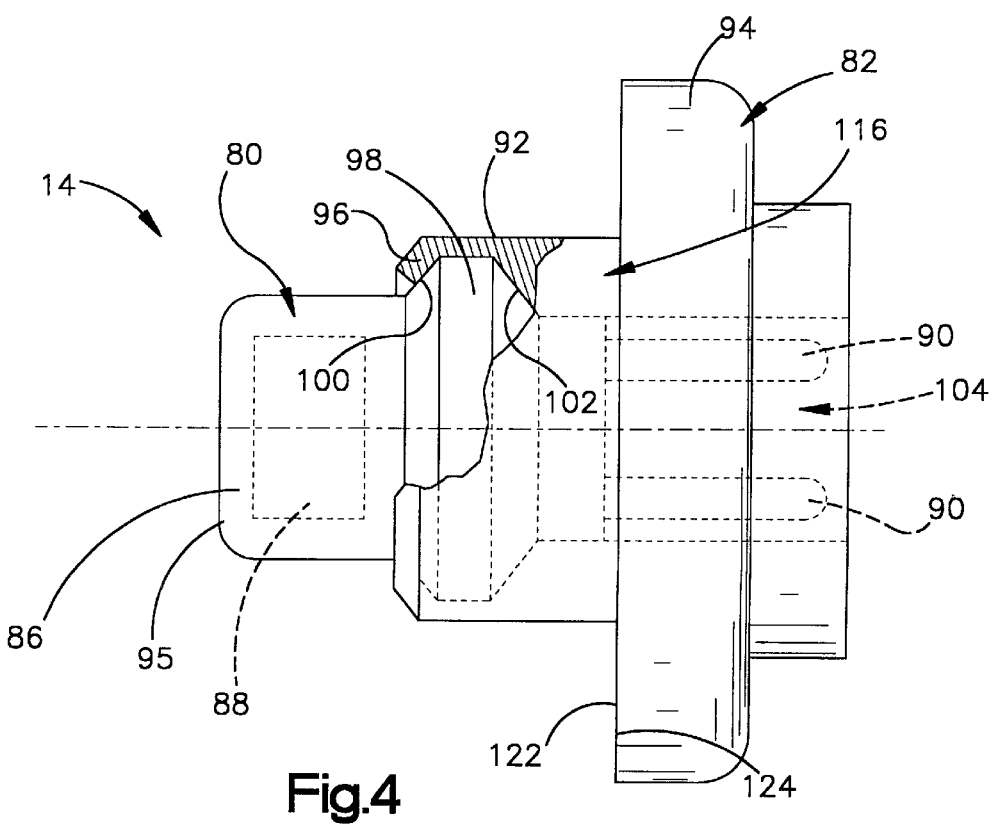
FIG. 4 is an enlarged view, partly in section, of parts of the apparatus of FIG. 1.

The initiator assembly 14 includes an initiator 80 (FIG. 4) and a retainer 82. The initiator 30 in the first embodiment of the present invention is an electrically actuatable device which is known as a squib, and has a generally cylindrical casing 86 containing a small body of pyrotechnic material 88. The pyrotechnic material 88 is ignited in a known manner upon the passage of electric current through the squib 80 between a pair of electrodes 90 projecting from the casing 86. When the pyrotechnic material 88 is ignited, it rapidly produces combustion products that are spewed outward from the casing 86.

The retainer 82 has a hollow cylindrical body 92 and a ring-shaped peripheral flange 94 that projects radially outward of the body 92. The flange 94 is located at one end of the body 92, and a rim 96 is located at the opposite end of the body 92. The casing 86 is received within the body 92 of the retainer 82, and has an end portion 95 projecting outward from the body 92. The rim 96 on the body 92 of the retainer 82 is crimped against the casing 86. A radially enlarged, tapered portion 98 of the casing 86 is thus clamped firmly between a pair of opposed tapered inner surfaces 100 and 102 of the body 92. The electrodes 90 are accessible in a socket 104 which is open at the opposite end of the body 92.

As further shown in FIG. 2, the second end wall 24 of the container 12 has an annular outer shoulder surface 110 facing oppositely away from the annular inner shoulder surface 40. The outer shoulder surface 110 defines a circular opening 112 which is centered on the axis 43. As shown in FIG. 1, the initiator assembly 14 is received through the opening 112, with the flange 94 on the retainer 82 abutting the end wall 24 at the cuter shoulder surface 110. The initiator assembly 14 thus projects into the fluid flow path 62 defined by the end wall 24, as noted above. An annular rim portion 114 of the end wall 24 initially projects axially away from the outer shoulder surface 110 and is subsequently crimped around the retainer flange 94 to hold the initiator assembly 14 securely in place on the end wall 24.

A generally cylindrical filter 120 extends circumferentially around the initiator assembly 14 within the fluid flow path 62, as shown in FIG. 1. As shown separately in FIG. 5, the filter 120 has a central section 122 and a pair of opposite end sections 124 and 126. The end sections 124 and 126 of the filter 120 fit closely against a corresponding pair of annular inner surfaces 128 and 130 (FIG. 2) of the end wall 24. The surface 128 defines the short cylindrical portion 70 of the flow path 62. The surface 130 is separated from the surface 128 by the annular portion 72 of the flow path 62. The central section 122 of the filter 120 is radially enlarged so as to project radially into the annular portion 72 of the flow path 62. In the first embodiment of the present invention, the filter 120 is a one-piece structure formed of flattened, expanded metal, and is configured as a rolled strip with overlapping opposite end portions 132 and 134.

The valve assembly 18 is a modular assembly of parts that are interconnected separately from the container 12 and the initiator assembly 14. As shown separately in FIG. 6, the interconnected parts of the valve assembly 18 include a tubular valve housing 180, a metering member 182, and a spring 184 (shown schematically).

The valve housing 180 has a cylindrical side wall 186 and a circular end wall 188, each of which is centered on a longitudinal axis 189. A cylindrical inner surface 192 of the end wall 188 defines a vent 194 extending axially through the center of the end wall 188. The side wall 186 has cylindrical inner and outer surfaces 196 and 198. The cylindrical inner surface 196 defines a longitudinally extending bore 199. An annular end surface 200 of the side wall 186 defines an open end 202 of the housing 180 opposite the end wall 188.

The side wall 186 of the valve housing 180 further has a pair of annular inner edge surfaces 204 and 206. The first inner edge surface 204 defines a circular inlet port 208 extending through the side wall 186. The second inner edge surface 206 defines a circular outlet port 210 extending through the side wall 186 at a location diametrically opposite the inlet port 208.

The metering member 182 in the preferred embodiment of the present invention is a spool which is contained and supported for movement axially within the bore 199. The spool 182 has an initial position in which it abuts a split ring 212 engaging the housing 180 adjacent its open end 202, as shown in FIG. 6, and is movable axially toward the end wall 188 against a bias of the spring 184.

A cylindrical land 220 on the spool 182 is located next to a circumferentially extending groove 222 in the spool 182. The spool 182 and the housing 180 together define inlet and outlet orifices 230 and 232 which are disposed between the groove 222 and the ports 208 and 210 and which vary in flow area upon movement of the spool 182 axially within the bore 199. A first pilot orifice 234 in the spool 182 communicates the groove 222 with the vent 194. A second, oppositely extending pilot orifice 236 communicates the groove 222 with the open end 202 of the housing 180.

Referring again to FIG. 2, the valve compartment 76 in the end wall 24 of the container 12 is defined in part by a cylindrical inner surface 240 of the end wall 24. A planar side surface 242 (FIG. 3) of the end wall 24 has an annular edge 244 defining a circular open end 246 of the valve compartment 76. A planar inner surface 248 of the end wall 24 has a circular shape centered on the axis 77, and defines a closed inner end of the valve compartment 76.

Figure 7:
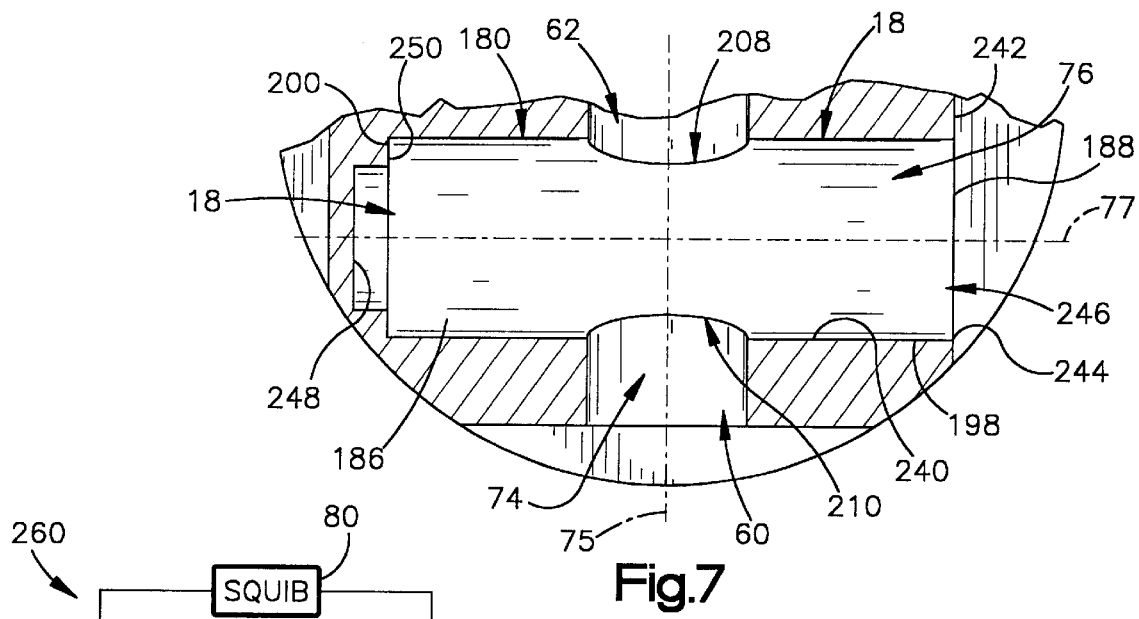
FIG. 7 is a view similar to FIG. 3 showing parts in a fully assembled relationship.

When the valve assembly 18 is being installed on the end wall 24, it is received longitudinally through the open end 246 of the valve compartment 76. The valve assembly 18 is then moved inward along the length of the valve compartment 76 until the annular end surface 200 of the housing 180 abuts an opposed annular inner shoulder surface 250 of the end wall 24, shown in FIG. 7. The valve assembly 18 is thus moved to an installed position in which the ports 208 and 210 in the housing 180 are centered on the axis 75, and is retained in its installed position by an interference fit where the cylindrical outer surface 198 of the housing 180 adjoins the cylindrical inner surface 240 of the end wall 24.

Figure 8:
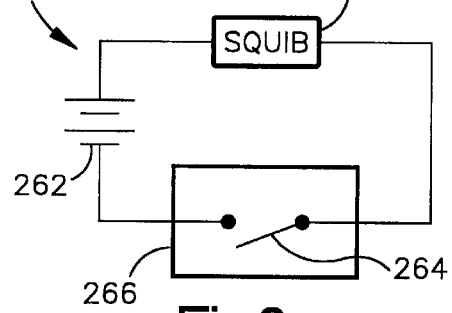
FIG. 8 is schematic view of an electrical circuit including a part of the apparatus of FIG. 1.

As shown schematically in FIG. 8, the squib 80 in the initiator assembly 14 is included in an electrical circuit 260 with a power source 262, which preferably comprises the vehicle battery and/or a capacitor, and a normally open switch 264. The switch 264 is part of a sensor 266 which senses one or more vehicle conditions that indicate the occurrence of a crash. Such a sensor is known in the art.

The sensor 266 may sense a crash-indicating condition that meets or exceeds a predetermined threshold level. This indicates the occurrence of crash having a level of severity which is predetermined to require inflation of the air bag or other vehicle occupant protection device associated with the inflator 10. The switch 264 then closes and electric current is directed through the squib 80 to ignite the pyrotechnic material 88 (FIG. 4) in the squib 80.

When the pyrotechnic material 88 in the squib 80 is ignited, it generates combustion products that are spewed from the squib 80 to the foil sheet 56 (FIG. 1) at the chamber opening 42. Those combustion products provide thermal and percussive energy which ruptures the foil sheet 56 and ignites the adjacent pyrotechnic material 54. The pyrotechnic material 54 then produces additional combustion products which, together with the combustion products emitted from the squib 80, provide thermal and percussive energy which ruptures the burst disk 44. The inflation fluid 16 is thus released to flow outward from the chamber 15 through the chamber opening 42, and further outward along the flow path 62 to the valve assembly 18 and the exit opening 60. The filter 120 blocks the severed pieces of the casing 86 and the burst disk 44 from being carried outward to the valve assembly 18 or the exit opening 60.

The pressure in the chamber 15 decreases continuously from the storage level to the ambient level as the inflation fluid 16 flows outward. However, the valve assembly 18 regulates the outlet flow of inflation fluid to prevent the flow rate from decreasing in direct proportion to the decreasing pressure in the chamber 15. As the inflation fluid flows through the groove 222 (FIG. 6) between the inlet and outlet orifices 230 and 232, some of the inflation fluid flows through the pilot orifices 234 and 236. The inflation fluid flowing through the first pilot orifice 234 flows further outward through the vent 194. The inflation fluid flowing through the second pilot orifice 236 is not vented, but instead pressurizes the space between the spool 182 and the surface 248 defining the closed end (FIG. 7) of the valve compartment 76. This causes the spool 182 to move to the right, as viewed in FIG. 6, and thereby to enlarge the inlet and outlet orifices 230 and 232. Such enlargement of the inlet and outlet orifices 230 and 232 helps to maintain desired flow rates outward along the flow path 62 as the pressure in the chamber 15 decreases from the storage level toward the ambient level.

Figure 9:
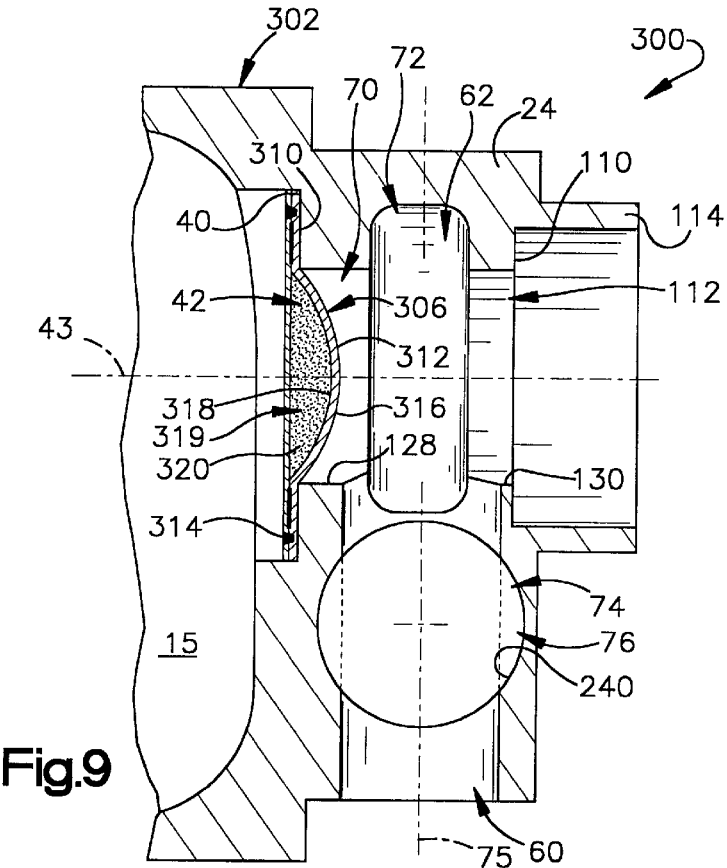
FIG. 9 is a view similar to FIG. 2 showing parts of an apparatus comprising a second embodiment of the present invention.

An inflator 300 comprising a second embodiment of the present invention is shown partially in FIG. 9. The inflator 300 includes a container 302 with many parts that are substantially the same as corresponding parts of the container 12 described above. This is indicated by the use of the same reference numbers for such corresponding parts in FIGS. 9 and 2. The container 302 thus defines an inflation fluid pressure chamber 15, and has an end wall 24 defining a chamber opening 42, an exit opening 60, and an inflation fluid flow path 62 extending between the chamber opening 42 and the exit opening 60. However, the container 302 has closure part in the form of an alternative burst disk 306 in place of the burst disk 44 described above.

The burst disk 306 is structurally similar to the burst disk 44, but is oriented oppositely relative to the burst disk 44. Specifically, the burst disk 306 has a flat, annular rim portion 310 projecting radially outward from a dome-shaped central portion 312. The rim portion 310 of the burst disk 306 is fixed and sealed to the end wall 24 of the container 302 by a circumferentially extending weld 314. The central portion 312 of the burst disk 306 extends across the chamber opening 42, but is bowed outward rather than inward of the chamber 15. The central portion 312 of the burst disk 306 thus has a convex outer side surface 316 facing outward of the chamber 15 and a concave inner side surface 318 facing oppositely inward of the chamber 15.

The concave inner side surface 318 defines a recess 319 containing a body of pyrotechnic material 320. Accordingly, the pyrotechnic material 320 in the second embodiment of the invention is located inside rather than outside the corresponding chamber 15. A sheet of metal foil 322 retains the pyrotechnic material 320 in the recess 319 in the same manner as described above with reference to the sheet of metal foil 56 in the first embodiment.

When the inflator 300 is fully assembled for installation in a vehicle, the end wall 24 of the container 302 supports a filter, an initiator assembly, and a valve assembly (not shown). Each of these parts is substantially the same as the corresponding pert 120, 14 or 18 of the inflator 10 described above. Moreover, the chamber 15 then contains pressurized inflation fluid like the fluid 16 described above. When the initiator assembly in the inflator 300 is actuated, the corresponding squib emits combustion products that move against the central portion 312 of the burst disk 306 at the convex outer side surface 316. The thermal and percussive energy of those combustion products propagate through the central portion 312 of the burst disk 306 and ignite the pyrotechnic material 320 in the recess 319. The central portion 312 of the burst disk 306 is then ruptured under the influence of the combustion products at its opposite sides.

In accordance with a particular feature of the present invention, the amount of pyrotechnic material 320 that is mounted on the burst disk 306 in the second embodiment is less than the amount of pyrotechnic material 54 that is mounted on the burst disk 44 in the first embodiment. This is because a first amount of percussive energy is needed to deflect and rupture the burst disk 44 inward against the pressure force of the inflation fluid 16 stored in the container 12, whereas a second, lesser amount of percussive energy is needed to deflect and rupture the disk 306 outward in conjunction with the corresponding inflation fluid pressure forces.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
    an inflator structure defining an inflation fluid pressure chamber, said inflator structure including a closure structure closing said chamber, said closure structure having a rupturable portion;
    a first body of pyrotechnic material mounted on said rupturable portion of said closure structure; and
    a pyrotechnic initiator mounted on said inflator structure said pyrotechnic initiator being spaced apart from said first body of pyrotechnic material, said initiator containing a second body of pyrotechnic material which, when ignited, produces combustion products that ignite said first body of pyrotechnic material.

2. Apparatus as defined in claim 1 wherein said inflator structure defines a chamber opening, said closure structure comprising a burst disk, said rupturable portion of said closure structure being a central portion of said burst disk which extends across said chamber opening.

3. Apparatus comprising:

an inflator structure defining an inflation fluid pressure chamber, said inflator structure including a closure structure closing said chamber, said closure structure having a rupturable portion;

a first body of pyrotechnic material mounted on said rupturable portion of said closure structure;

a pyrotechnic initiator mounted on said inflator structure separately from said first body of pyrotechnic material, said initiator containing a second body of pyrotechnic material which, when ignited, produces combustion products that ignite said first body of pyrotechnic material; and inflation fluid stored under pressure in said chamber, said first body of pyrotechnic material being located inside said chamber.

4. Apparatus as defined in claim 3 wherein said initiator is located outside said chamber.

5. Apparatus comprising:

an inflator structure defining an inflation fluid pressure chamber, said inflator structure including a closure structure closing said chamber, said closure structure having a rupturable portion with concave surface defining a recess; and a body of pyrotechnic material mounted on said closure structure within said recess.

6. Apparatus as defined in claim 5 further comprising a sheet structure holding said body of pyrotechnic material in said recess.

7. Apparatus as defined in claim 5 wherein said concave surface faces outward of said chamber.

8. Apparatus as defined in claim 5 wherein said concave surface faces inward of said chamber.

9. Apparatus as defined in claim 5 wherein said rupturable portion of said closure structure further has a convex surface, said concave surface and said convex surface comprising opposite side surfaces of a dome-shaped portion of said closure structure.

10. Apparatus as defined in claim 9 wherein said inflator structure defines a chamber opening, said closure structure comprising a burst disk, said rupturable portion of said closure structure being a central portion of said burst disk which extends across said chamber opening to close said chamber.

* * * * *